UNITED STATES PATENT OFFICE.

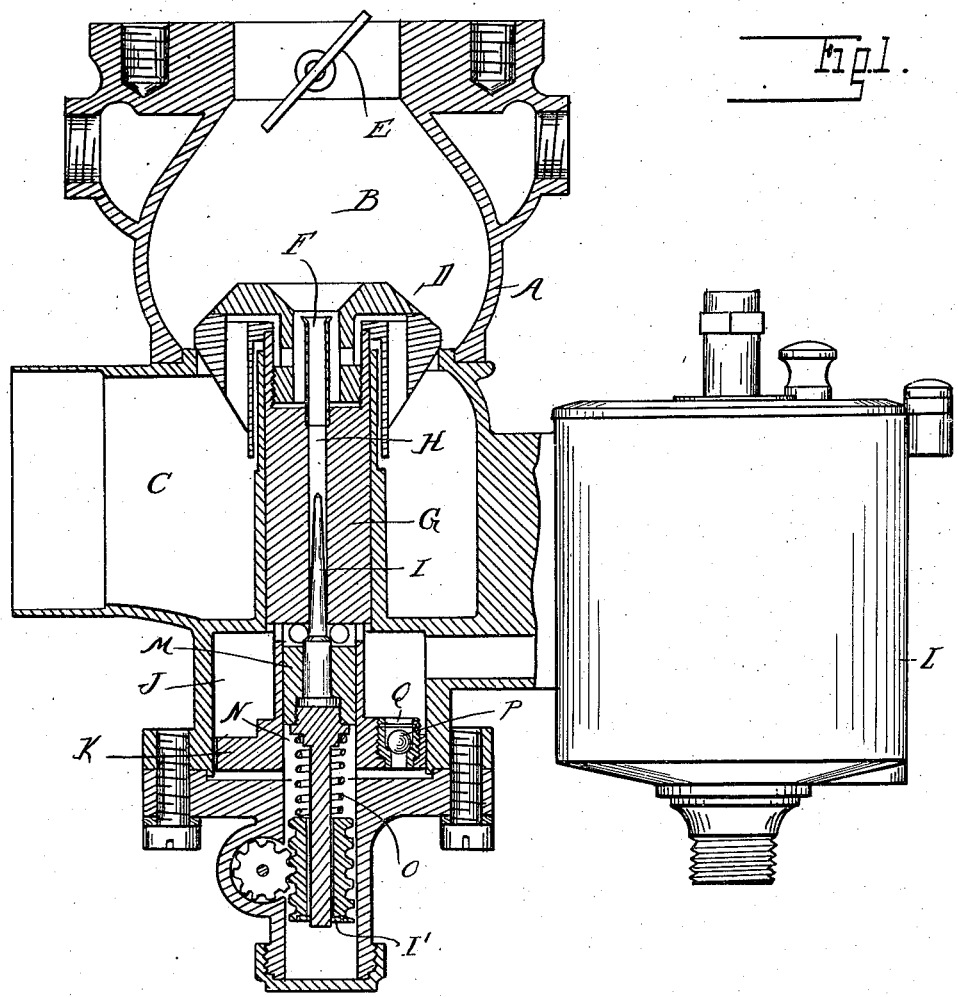

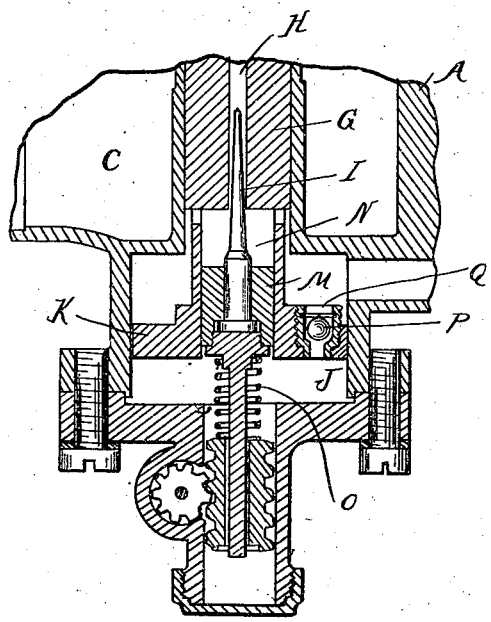
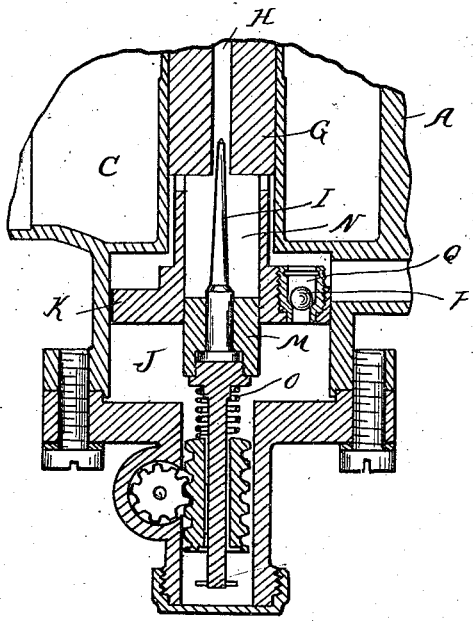

CHARLES H. KIRBY, OF HIGHLAND PARK, MICHIGAN, ASSIGNOR TO DETROIT LUBRICATOR COMPANY, OF DETROIT, MICHIGAN, A CORPORATION OF MICHIGAN.

CARBURETER.

1,159,049. Specification of Letters Patent. Patented Nov. 2, 1915.

Application filed June 19, 1915. Serial No. 34,985.

*To all whom it may concern:*

Be it known that I, CHARLES H. KIRBY, a citizen of the United States of America, residing at Highland Park, in the county of Wayne and State of Michigan, have invented certain new and useful Improvements in Carbureters, of which the following is a specification, reference being had therein to the accompanying drawings.

The invention relates to carbureters of that type in which the flow of the liquid fuel is controlled by the coöperative action of an automatic air valve and a metering pin.

It is the particular object of the invention to provide means for increasing the discharge of the liquid fuel upon a sudden opening of the throttle, and at the same time to instantaneously restore the parts to normal position when the throttle is stationary or is adjusted slowly.

To this end the invention comprises means for resisting the sudden opening movement of the automatic valve, which will permit the unresisted closing of the same, as hereinafter set forth.

In the drawings: Figure 1 is a longitudinal section through the carbureter; Fig. 2 is a similar view showing the position of parts after a sudden opening of the throttle; and Fig. 3 is a similar view showing the by-pass valve open.

A is the carbureter casing containing the mixing chamber B, the air inlet C and the automatic valve D for controlling communication between said inlet and mixing chamber.

E is the throttle valve, and F is the liquid fuel discharge nozzle carried by the automatic valve D.

G is the stem of the automatic valve, having a central passage H connecting with the nozzle F, and I is a metering pin for variably restricting said passage. The arrangement is such that when the valve D is lifted by the pressure of the incoming air, the stem G will be adjusted relative to the metering pin to increase the area of the passage for the liquid.

To prevent the starving of the explosive mixture, when the throttle is suddenly opened, due to the inertia of the liquid, I have provided a dash-pot J, in which is located a piston K secured to the stem G. This dash-pot forms a part of the oil passage from the float chamber L to the nozzle F, and the arrangement is such that upon the sudden rising of the valve D a suction is developed in the dash-pot to resist such movement. This suction may, if desired, be untilized for the further function of drawing down the metering pin so as to further increase the passage for the liquid. As shown, the metering pin is attached to a piston M within a cylindrical recess N in the stem G, a spring O being arranged to hold said piston in normal position, but yielding to permit movement when the suction is exerted. A pin I' at the lower end of the metering pin I is employed to limit the upward movement of the metering pin without restricting its downward motion.

With the construction as above described, whenever the valve D is suddenly moved upward, as would result when the throttle valve E is quickly opened, the dash-pot J will operate to resist the movement of said valve D, and also by its suction will draw downward the metering pin I so as to increase the passage for the liquid fuel. It is, however, desirable that this retarding of the movement of the valve should only occur when the valve is lifted, and that at all times the valve should be free to quickly return to its normal position. This I have accomplished by providing a by-pass for the dash-pot controlled by a check valve, and as shown, P is the check valve arranged in a port Q in the piston K. Thus, whenever the throttle E is closed after having been previously opened, the valve D is permitted to re-seat without interference from the dash-pot, but the re-opening of said valve can only be accomplished slowly, or by overcoming the resistance of the dash-pot.

What I claim as my invention is:—

1. In a carbureter, the combination with the casing containing the mixing chamber, of an automatic air valve controlling the admission of air to said mixing chamber, coöperating means variably restricting the flow of the liquid fuel, and a dash-pot for retarding the opening movement of said valve, permitting the unresisted closing thereof.

2. In a carbureter, the combination with a casing containing the mixing chamber, of an automatic valve controlling the admission of air to said chamber, a nozzle for discharging liquid fuel into said chamber, a metering pin coöperating with said automatic valve for variably restricting the flow of liquid fuel, a dash-pot for resisting sudden opening of said valve, operating by its suction to further increase the flow of liquid fuel, said dash-pot permitting the unresisted closing of said valve.

3. In a carbureter, the combination with a casing containing the mixing chamber, of an automatic valve controlling the admission of air to said chamber, a nozzle for discharging liquid fuel into said chamber, a metering pin coöperating with said automatic valve for variably restricting the flow of liquid to increase the same upon the opening of said valve, a dash-pot for resisting the sudden opening of said valve, and a valve-controlled by-pass for said dash-pot permitting the unresisted closing of said valve.

4. In a carburter, the combination with a casing, containing the mixing chamber, of an automatic valve controlling the admission of air to said chamber, a nozzle for discharging liquid fuel into said chamber, a piston connected with said valve, a cylinder coöperating with said piston to form a dash pot for resisting the sudden opening of said valve, and a valve-controlled by-pass for said dash-pot permitting the unresisted closing of said valve.

5. In a carbureter, the combination with a casing having a mixing chamber, a nozzle for discharging liquid fuel into said chamber, a piston and cylinder forming a dash-pot, means operating upon a sudden increase in the velocity of air passing through the mixing chamber, producing a suction stroke of the piston, means acted upon by the suction of said piston to increase the supply of fuel to the nozzle, and a valve-controlled by-pass for said dash-pot permitting the unrestricted return stroke of the piston.

In testimony whereof I affix my signature in presence of two witnesses.

CHARLES H. KIRBY.

Witnesses:
  JAMES P. BARRY,
  PHYLLIS COBURN.